P. K. Dederick,
Hay Press.

No. 49,678.     Patented Aug. 29, 1865.

Witnesses:
James M. Forwan
Josh Almong

Inventor:
P. K. Dederick
By his Atty J. Dennis Jr.

UNITED STATES PATENT OFFICE.

PETER K. DEDERICK, OF ALBANY, NEW YORK, ASSIGNOR TO LEVI DEDERICK AND PETER K. DEDERICK, OF SAME PLACE.

IMPROVED CAPSTAN FOR WORKING BEATER HAY-PRESSES.

Specification forming part of Letters Patent No. 49,678, dated August 29, 1865.

*To all whom it may concern:*

Be it known that I, PETER K. DEDERICK, of the city and county of Albany, State of New York, have invented an Improved Capstan for Working Beater Hay-Presses, &c.; and I do hereby declare that the following description and accompanying drawings are sufficient to enable any person skilled in the art or science to which it most nearly appertains to make and use my said invention or improvements without further invention or experiment.

The nature of my invention consists in the combination and arrangement of devices hereinafter described and claimed.

Figure 1:
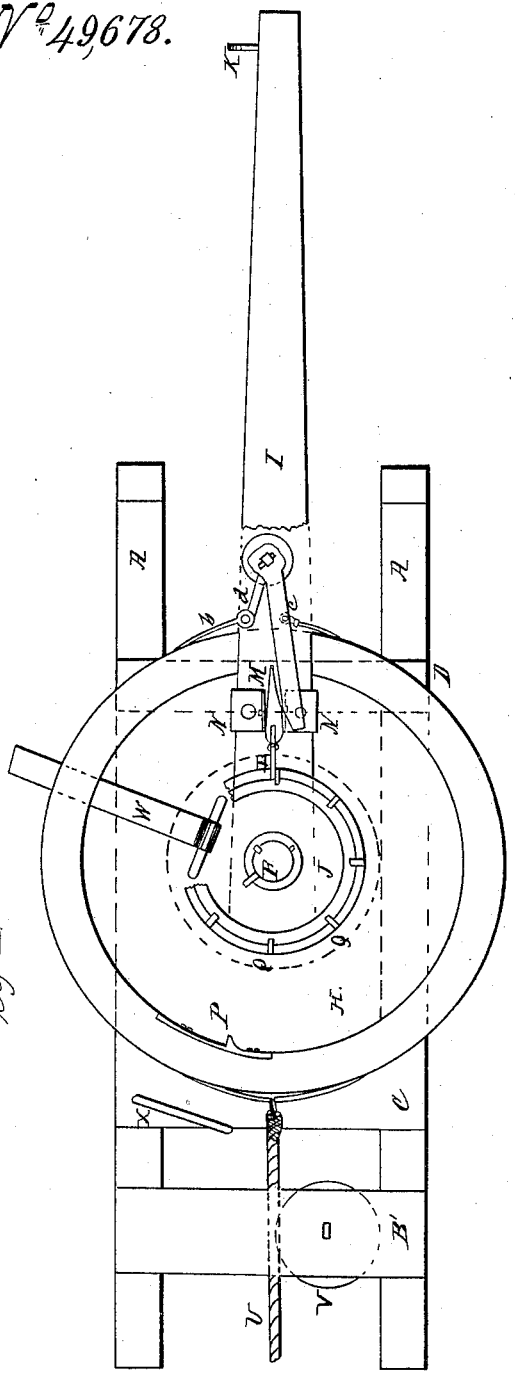
Figure 2:
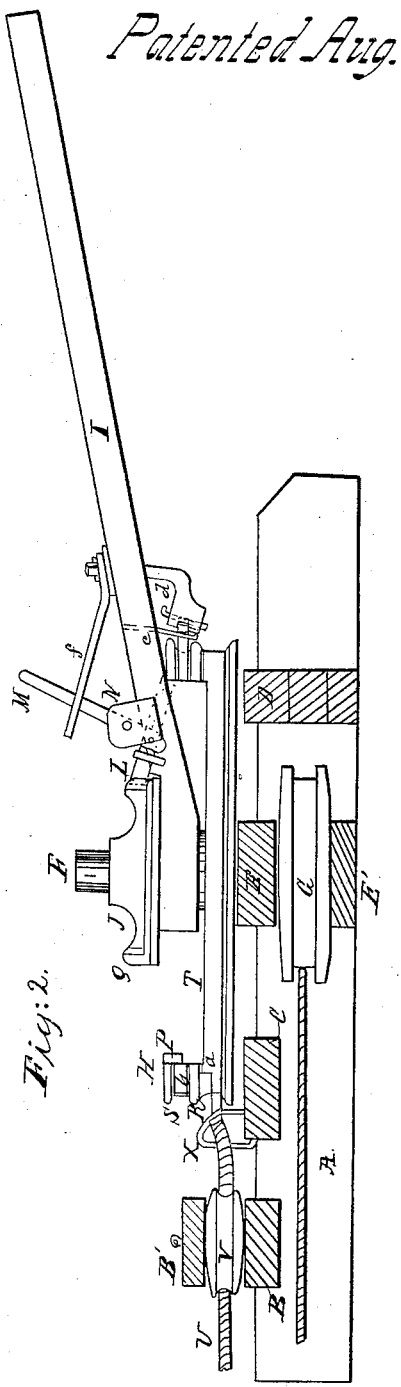

In the above-mentioned drawings, Figure 1 is a plan of my improved capstan. Fig. 2 is a sectional elevation of the same.

In these drawings, A A are the sills of the frame, connected by the bars B, C, D, and E E′, and the two latter are perforated for the shaft F of the capstan to turn in, as shown in Fig. 2.

On the shaft F, between the bars E E′, the pulley G is fastened, to wind the rope that works the follower to compress the bale by means of toggle-levers or other devices, according to the construction of the press worked.

The pulley H is fitted to turn freely on the shaft F, above the bar E, and the lever I is also fitted to turn freely on the shaft F, above the pulley H, on which it rests, and the clutch-pulley J, above the lever I, is keyed or otherwise fastened firmly to the shaft F. The lever I has a hook, K, near the end, to which the animal is hitched to draw the lever around and operate the capstan The sliding bolt L is arranged to traverse in a mortise through the lever I, and is supported near each end by a hasp or staple, and is worked by the lever M, with its fulcrum on a pin in the stands N N fastened to the lever I. When the bolt L is slid out from the shaft it catches the stop P on the pulley H and turns the pulley by the lever; but when it is slid in toward the shaft it strikes the stops Q Q on the clutch-pulley J, and turns the shaft F and pulley G to wind the rope and operate the follower of the press to be worked.

The pulley H has two grooves, R and S, in its periphery, and the metal strap T is made to work freely around the pulley in the groove R, and has the rope U fastened to it to raise the beater of the press, the rope U passing over the pulley V on the bar B and around such other pulleys as will conduct it to the beater to be raised. The strap T has a notch, *a*, in its upper edge, into which notch *a* the locking-lever W falls and locks the strap to the pulley, so that it is carried around by it to wind the rope U and raise the beating-block which is to beat down the hay in the press. When the lever W is carried around to the inclined plane X it is raised by the inclined plane out of the notch *a* in the strap, to release the strap and let it slip around and drop the beater onto the hay in the press and beat it down, the rope U drawing the strap around on the pulley. When the lever W passes the inclined plane it drops onto the strap T until it comes to the notch *a*, when it again locks the strap to the pulley to raise the beater and repeat the operation.

The inclined plane X is fastened to the bar C. There are some pieces put on top of the ends of the bar B, and the bar B′ is put on the pieces, and bolts pass down through both bars and pieces to fasten them to the sills A A.

The pulley V is arranged between the bars B B′, and turns on a pin passing down through the bars and pulley.

The friction-strap *b* surrounds the pulley H in the groove S, with one end fastened to the pin *c* in the lever I and the other end fastened to the crank *d*, which turns in the lever I, and is worked by the lever *f*, above the lever I. This strap may be used to check the motion of the pulley H when it is desirable to do so for any purpose.

Having thus described my invention, what I claim as new, and desire to secure by Letters Patent, is as follows:

1. The arrangement of the loose pulley-wheel H, with the belt or strap T surrounding it, in the manner and for the purpose specified.

2. The locking-bar W, passing through the rim of the wheel H and operating in connection with the notch *a* in strap or band T, in the manner and for the purpose substantially as described.

3. The combination of the inclined plane X, the notched strap, the locking-bar L, arranged as and for the purpose specified.

4. The bolt L, arranged so as to lock the lever I alternately to the pulley H and the clutch-pulley J and disconnect either or both by moving the hand-lever.

PETER K. DEDERICK.

Witnesses:
C. R. DEDERICK,
LEVI DEDERICK.